US007059526B1

(12) United States Patent
Sullivan et al.

(10) Patent No.: US 7,059,526 B1
(45) Date of Patent: *Jun. 13, 2006

(54) PILL PRINTING AND IDENTIFICATION

(76) Inventors: Scott L. Sullivan, 3 Garden Ridge, Chappaqua, NY (US) 10514; Robert J. Hess, 205 Hudson St., Apt. 1101, Hoboken, NJ (US) 07030

( * ) Notice: Subject to any disclaimer, the term of this patent is extended or adjusted under 35 U.S.C. 154(b) by 0 days.

This patent is subject to a terminal disclaimer.

(21) Appl. No.: 10/660,276

(22) Filed: Sep. 11, 2003

Related U.S. Application Data

(63) Continuation of application No. 09/432,469, filed on Nov. 3, 1999, now Pat. No. 6,776,341, which is a continuation of application No. 08/866,598, filed on May 30, 1997, now Pat. No. 5,992,742, and a continuation-in-part of application No. 08/286,785, filed on Aug. 5, 1994, now Pat. No. 6,799,725.

(60) Provisional application No. 60/018,751, filed on May 31, 1996.

(51) Int. Cl.
*G06K 7/10* (2006.01)

(52) U.S. Cl. ............................ 235/462.01; 235/472.01; 235/375

(58) Field of Classification Search ...............................
235/462.01–462.45, 472.01, 472.02, 472.03, 235/454, 455, 375, 380, 382, 382.5, 494
See application file for complete search history.

(56) References Cited

U.S. PATENT DOCUMENTS

| | | | |
|---|---|---|---|
| 3,556,342 A | 1/1971 | Guarr | |
| 3,871,156 A | 3/1975 | Koenig | |
| 3,889,591 A | 6/1975 | Noguchi | |
| 3,931,884 A | 1/1976 | Ackley | |
| 3,997,063 A | 12/1976 | Adams | |
| 4,224,123 A | 9/1980 | McLain | |
| 4,266,478 A | 5/1981 | Ackley | |
| 4,350,442 A | 9/1982 | Arild | |
| 4,360,125 A | 11/1982 | Martindale | |
| 4,478,658 A | 10/1984 | Wittwer | |
| 4,548,825 A | 10/1985 | Voss | |
| 4,573,606 A | 3/1986 | Lewis | |
| 4,655,026 A | 4/1987 | Wigoda | |
| 4,733,362 A | 3/1988 | Haraguchi | |
| 4,818,850 A | 4/1989 | Gombrich | |
| 4,835,372 A | 5/1989 | Giombrich | |
| 4,853,521 A * | 8/1989 | Claeys et al. ............... 235/375 |
| 4,857,713 A | 8/1989 | Brown | |
| 4,857,716 A | 8/1989 | Gombrich | |
| 4,869,392 A | 9/1989 | Moulding | |
| 4,883,180 A | 11/1989 | Humphrey | |
| 4,980,292 A | 12/1990 | Elbert | |
| 5,009,894 A | 4/1991 | Hsiao | |
| 5,044,516 A | 9/1991 | Hoar | |
| 5,085,510 A | 2/1992 | Mitchell | |
| 5,118,369 A | 6/1992 | Shamir | |
| 5,129,974 A | 7/1992 | Aurenius | |
| 5,164,597 A * | 11/1992 | Lodder ................... 250/341.8 |
| 5,181,189 A | 1/1993 | Hafner | |
| 5,187,368 A * | 2/1993 | Galante et al. ........... 250/341.5 |
| 5,231,938 A | 8/1993 | Gore | |
| 5,310,082 A | 5/1994 | Coustenoble | |
| 5,367,148 A | 11/1994 | Storch | |
| 5,389,904 A | 2/1995 | Tao | |
| 5,401,059 A | 3/1995 | Ferrario | |
| 5,482,008 A | 1/1996 | Stafford | |
| 5,502,944 A | 4/1996 | Kraft | |
| 5,700,998 A | 12/1997 | Palti | |
| 5,713,485 A * | 2/1998 | Liff et al. ...................... 221/2 |
| 5,797,515 A * | 8/1998 | Liff et al. ...................... 221/2 |
| 5,845,264 A | 12/1998 | Nellhaus | |
| 5,883,370 A | 3/1999 | Walker | |
| 5,921,433 A * | 7/1999 | Friar et al. .................. 221/25 |
| 5,963,453 A * | 10/1999 | East ........................... 700/244 |
| 5,992,742 A | 11/1999 | Sullivan | |
| 6,003,006 A | 12/1999 | Colella | |
| 6,085,936 A * | 7/2000 | Friar et al. .................. 221/25 |
| 6,176,392 B1 | 1/2001 | William | |
| 6,543,692 B1 | 4/2003 | Nellhaus | |

FOREIGN PATENT DOCUMENTS

| | | |
|---|---|---|
| JP | 402159254 A | 6/1990 |
| JP | 07287736 A | 10/1995 |
| JP | 408000712 A | 1/1996 |
| WO | WO 88/05725 | 8/1988 |

OTHER PUBLICATIONS

New York Times Article entitled: For Bar Codes, An Added Dimension, Barnaby J. Feder, Apr. 24, 1991 (3 pages).
Western Publishing Company, Inc. entitled "Finally, a cure for the common code", Photocode, promotional flyer for booth at SCAN-TECH Oct. 13-15, 1987.
"Automatic Identification: Serving The Service Industries", ID Systems, Scan—Tech 87 Preview, vol. 7, No. 8 1987.
"Imprinting of Solid Oral Dosage Form Drug Products for Human Use", vol. 58, No. 175 Part III 58 FR 47948, Sep. 13, 1993.
Gerald E. Meyer et al., "Use of bar codes in impatient drug distribution", AJHP vol. 48 (May 1991) pp. 953-966.
Hokanson, Ja et al., "Potential use of bar codes to Implement automated dispensing quality assurance programs,", Hosp. Pharm. May 1985 Abstract 20(5):327-9, 333, 337.

* cited by examiner

*Primary Examiner*—Thien M. Le

(57) ABSTRACT

Method and identification system to keep track of individual pills dispensed to patients in a hospital by scanning a machine readable code assigned to each pill individually. The pills may be individually within single-pill containers. Inventory levels may be adjusted based on the scanning. Prior to dispensing the pills, a verification check may be performed.

35 Claims, No Drawings

PILL PRINTING AND IDENTIFICATION

CROSS-REFERENCE TO RELATED APPLICATIONS

This is a continuation of Ser. No. 09/432,469 filed Nov. 3, 1999, now U.S. Pat. No. 6,776,341, issued Aug. 17, 2004, which in turn is a continuation of Ser. No. 08/866,598 filed May 30, 1997, now U.S. Pat. No. 5,992,742, issued Nov. 30, 1999, which claims priority from provisional Ser. No. 60/018,751 filed May 31, 1996 and is a continuation-in-part of Ser. No. 08/286,785 filed Aug. 5, 1994, now U.S. Pat. No. 6,799,725 issued Oct. 5, 2004.

BACKGROUND OF THE INVENTION

1. Field of the Invention

This invention relates to a method of distribution of pills and a pill having a machine readable code.

2. Description of Related Art

Pills are packaged in containers, from single-pill containers to containers that contain thousands of pills. Pills encompass, for instance, tablets, caplets, gel-caps, and capsules, and contain either medication or a placebo. Pills come in a variety of shapes, sizes and colors to help distinguish one from the other.

Aside from possibly serving as an enticement for children, the configuration (shape, size, and color) of pills generally does not give one supplier or manufacturer a competitive edge over another due to the appeal of the particular configuration in the marketplace. If the pills of different suppliers contain different medicine, there is no reason for them to have the same configuration. If they did, one pill could easily be mistaken for the another, potentially leading to disastrous consequences.

If the pills of different suppliers contain the same medication, it makes sense for safety reasons to standardize the configuration to avoid the potential for mix-up in the event of switching between brands. Such a mix-up may lead to severe health risks and could be lethal.

On the other hand, a brand name may lose market share to a newcomer that merely copies the same pill configuration and, in a sense, passes it off as being an equivalent if not identical to the brand name version. The company owning the brand name may have spent years developing and promoting the outward appearance or product configuration of its pills to establish good will and may be unable to stop the newcomer from flooding the market with a cheaper, but identical version to capture market share. If sued for wrongful misappropriation of product configuration, the newcomer may successfully assert that for public health and safety reasons, the configurations should be the same to avoid consumer mix-up between pills containing different medications. In effect, the successful newcomer is permitted easier access to gain market share, because of the ability to profit from the consumer feeling comfortable switching brands due to the familiar configuration of the pills that the consumer was accustomed to with the brand name. Indeed, the newcomer's pill may provide the same impression of quality and efficacy as the brand name.

When a product shipped to one distributor finds its way to the territory of some other distributor in violation of the trademark rights of that other distributor, the product traveling in this manner is considered to be gray goods. The distributor who has trademark rights for the territory into which the gray goods travel may sue to stop such shipment of product between territories.

One difficulty, however, lies in determining the origin of the goods, particularly if the goods themselves are not marked in such as way as to distinguish them from one trademark territory to another. This has often been the case with pills. A problem is that although a package containing pills may include a territorial designation code, the pill itself is not assigned such a code and may therefore be easily repackaged to hide its channel of distribution. The absence of such a code fails to assist in the identification of the distributor licensee that was responsible.

Often pill containers are properly marked and sealed so that the manufacturing source can be identified by lot number. Since the container is sealed, one would expect that the pills inside the container match the lot number on the container. Regrettably, as the cost of medication rises, the temptation grows for merchants or suppliers to substitute some or all of the pills of the container with a cheaper generic version, seal the container, and pass it off as containing the pills from the original name brand. It is likely that the consumer will not suspect the switch, although may notice that the medication is less effective than expected. Regardless, the merchant profits handsomely. The manufacturer of the brand name product, however, in effect loses a sale and, worse, loses some of its good will as the consumer wrongfully blames the brand name manufacturer for the poor quality over which the manufacturer had no control. If the consumer suffers medically from the switched medication, the integrity of the brand name is damaged. In addition, the consumer did not get the brand name product for which he or she paid a premium. This problem arose because the consumer has no way of checking whether the pills in the container are the proper pills made by the labeled manufacturer.

Some medical institutions handle huge volumes of pills each day. Their employees go through the daily ritual of sorting the pills and dispensing them to the appropriate patients in accordance with each patient's specific dosage schedule. Mistakes do happen and pills get mixed up, particularly if they resemble each other in appearance. Any improperly administered medication can, of course, be life threatening to a patient. If generic versions are being used, then even the level of identification often afforded by brand name logo on the pill is absent. This problem arises because the pills may not have markings on them to correctly apprise staff of their medical content. If there is any question as to the content of a pill in the hospital environment, the pill is simply discarded. The cost of such discarded pills can only add to the ever increasing cost of medical care and insurance.

During clinical trials that test for efficacy of new medication, a select group of patients are given active medication, while another group take a placebo pill. It is preferred that these tests be conducted as single-blind or double-blind tests wherein even the doctor who administers the medication is not told which pills are active and which are placebo. However, as the doctor divides the medication consistently between the two groups, recording which patient receives which pill (as each pill is marked with a letter, number, or color code), the content of the pills for each patient becomes apparent to the doctor by observing the health of each particular patient during the trial. A doctor, following the Hippocratic Oath of medicine, may compromise the clinical trial by giving all the patients only those pills that the doctor perceives to contain the active medication. Also, the patients themselves may assess which pills are placebo and which are active by comparing the markings on the pills with the apparent effectiveness of the particular pill. Eventually, the test taker may become uncooperative and refuse to take any pill with markings that indicate a placebo, arguing that his or her health warrants taking real medication. The reliability of the clinical trial diminishes if an insufficient number of tests are conducted with the placebo.

These problems in clinical testing may lead to delays in gaining government drug regulatory approval. The problem may be especially acute with life sustaining drugs or cures for otherwise fatal diseases, because patients will become uncooperative when they know that only a placebo is being given. Here, of course, the problem is that the pills are marked in such a manner that the human eye can readily distinguish between them.

A Pharmacist generally fills all the prescriptions of a customer and thus should know the customer's medical history, which medication the customer may take and is currently taking. If a new prescription comes in, the Pharmacist is supposed to check for contra-indications regarding other medication currently prescribed to the customer. Unfortunately, the pills do not have warnings on them to let the Pharmacist know that filling the particular prescription may be dangerous if the customer is already on certain kinds of medication. Too much responsibility is placed on the Pharmacist and invariably mistakes are made, leading to life threatening consequences. The problem here is that no markings are provided either on the pill or container that the Pharmacist could readily check to avoid prescribing medically dangerous combinations of medications. In some cases, the Pharmacist has access to a computer having a software program designed to remind the Pharmacist of potential interactions of a particular drug. To activate the program, the Pharmacist must type in the National Drug Code pertaining to the particular drug or its drug name into the computer. This relatively simple task may sometimes be ignored or misused by Pharmacists.

Once a pill leaves its container, it becomes impossible to check its efficacy expiration date, its medication contents, etc. unless the container remains accessible. If the container is emptied and lost or otherwise discarded, unused pills will be unidentifiable, particularly if the pill lacks any brand name identification. It may be dangerous to take such a pill, depending upon the person's particular medical condition and the expiration date. The problem arises due to a lack of information on the pill itself.

The current distribution system requires that pills destined for off-the-shelf sales be packaged in their own sealed container to guard against tampering and contamination. The packaging is sized to contain a certain number of pills, from single-pill packaging, to bulk-size containers. This arrangement is necessary because pills are not marked in a manner that would permit the pills to be sorted from others at the place of purchase or dispensement. Only the containers are adequately marked to avoid confusion. Thus, the consumer has little choice in selecting the quantity of medication to purchase.

Persons whose vision is impaired or are blind are most susceptible to mixing up pills if different kinds of pills have the same feel and taste and such persons do not seek the assistance of others who can see. Such persons would find it beneficial to a device or system that assists in distinguishing between pills by relying upon their other senses, in particular, their hearing.

Keeping track of the efficacy of pills is a labor intensive task, requiring the patient or care giver to manually record when a pill is taken and when its effects wear off. Since the recording process is labor intensive, it is subject to human error and errors in recording the proper time. Nutrition may affect the efficacy of medication and recording information on nutrition is also a labor intensive task. Once the record is made, to be of lasting value, it must be stored in a data base. This requires some further manual effort in converting the manual entries from a journal into data entries into the computer.

Micro bar code is known. It is about one tenth the size of standard (MF=1) UPC bar code (Magnification Factor (MF) =1). Scanners for reading micro bar code are available commercially, such as from Neorex Corporation in Japan and Symbol Technologies, Inc. of Holtsville, N.Y. Symbol Technologies, Inc. has developed a 2D, high density bar code called PDF-417 and a corresponding scanner. The PDF-417 code is considered a high-density code capable of containing more information per area than standard UPC code.

It would be desirable to identify the source, distributor, medication contents and/or potency expiration date of a pill after the pill is dispensed, preferably through a scanner of machine readable code. Where identification of the code by reading it directly with the unaided eye poses a problem, it is preferred that the patterns within the code be too small to be resolved by an unaided eye.

SUMMARY OF THE INVENTION

According to the invention, the protocol followed by a nurse may include scanning his or her ID badge, room code, and patient ID bracelet upon entering a room using a hand-held scanning wand plugged into a wall connector which links the scanner to the hospital computer network. The nurse then scans the medication from pre-printed coded labels in the case of a liquid medicant, or scans a suspended bar code element located in the liquid, as described below, and/or scans the code located on the pill surface, as described above. The network then verifies that the patient information, the nurse information, the room information and the medication information is correct and authorized and records all of this information in a secured memory storage. The billing computer is updated to account for the cost of the exact medication scanned and the scheduling computer is interrogated to ensure that the medication is proper and timely (not too early or late) administered. If all is correct, a green light or appropriate sound or signal is activated in the patient's room, signaling the nurse to give the medication. Once given, the nurse transmits a verification signal back to the computer to be recorded and later used as proof of the nurse witnessing the patient taking the medication. If the medication is improper, or the nurse is not on a predetermined list, to or the medication is too early or late, as prescribed by the attending doctor or any other conflict is detected), an alarm (or other signal) is activated to appropriate security and/or a red stop signal is provided to the nurse.

DESCRIPTION OF THE PREFERRED EMBODIMENT

The contents of pending patent application Ser. No. 08/286,785, filed Aug. 5, 1994 is incorporated herein by reference. The term pill is defined as any type of tablet, caplet, gel-cap, pellet, gum-piece, capsule, or other edible (or at least biocompatible) item that contains any consumable herb, chemical, mineral, vitamin, plant or animal product, or drug including an active medication or a placebo. A bar-type code may be either printed directly on an outer surface of the pill, on another layer located beneath the outer layer of the pill yet visible from the exterior of the pill, or printed on a label that is secured to any outer surface layer or underlying layer of the pill.

The code may be edible and/or digestible and be part of the medication contents of the pill. The pill be made of layers, including an inner layer, an outer layer and an intermediate layer between the inner and outer layers. This intermediate layer may be formed by printing, such as with a conventional ink-jet type printer, but is used to dispense ink onto the pill. The "ink" may be any substance including the medication of the pill and/or a drug such as a time release. Indeed, different "inks" may be used each providing a different time release drug and be interspersed between different layers.

If the bar code is printed on a label, the label may be made of a digestible substance, such as a protein base material including gelatin, collagen, hard or soft keratin, and other materials including waxes, polymeric materials (water-based or otherwise), sugar based substrate or certain water-soluble plastics such as polyvinyl alcohol (PVOH), or made of an indigestible substance including certain plastics, such as MYLAR or ethylene-vinyl alcohol (EVOH) sheet or film, so that the label passes through the body without damage. In this later case, the label may permit subsequent analysis in which case the code itself should be made of a material resistant to the environment within the human body so that the code may be read after it leaves the body with stool. Once separated from the stool, the code may be read. The read information may be useful in verifying to clinical trial testing authorities that the pill in fact was digested.

According to the invention, it is preferred that the patterns of the codes located on the pills are too tiny and complex for the unaided eye to discern differences in the patterns of the codes of two pills. It is preferred that only an optical scanner (or other suitable electronic device) be capable of reading such machine readable code. This may be of particular help during clinical trials, as discussed below.

One of the problems with clinical trial testing of pills is that a placebo pill is eventually recognized by those taking it (or those observing the patients) due to the absence of any relief in the patients' symptoms. Such patients may become uncooperative and refuse to participate further in the trials on the basis that the placebo pills are not helping them at all. When this happens, the reliability of the clinical trials diminishes, because there is no longer any comparison being made with a "control" group of placebo-pill takers.

One solution to this problem may be to set aside a group of codes that designate a placebo and another group of codes that designate the active medication. In this manner, the placebo takers will be given pills having different markings on them and therefore will not be able to associate a particular code with the absence of effectiveness. Eventually, however, the placebo taker may catch on that the code is being changed strictly for his/her benefit and refuse to participate in the trials any longer.

Regardless of the type of coding used, as a generally rule, the coding scheme will eventually be determined by those involved with clinical trials because, each code (or groups of codes) representing active medication and placebos will be different. Since the codes on prior art pills may be read by the human eye, it is relatively easy to connect which codes on which pills yield healthy results in the patients that take them.

In accordance with the invention, one way to defeat the placebo taker from figuring out the code system is to give a false sense of security that the pill being taken is the same as that of another whose pill does relieve the symptom. Under such conditions, contact between trial participants should be encouraged. The false sense of security comes about by marking both the placebo and the medication with the same readable code, such as letters and/or numbers. Thus, both participants believe they are taking the same medication, but it only works for one of them (since the other is taking the placebo).

Marking both with the same code runs the risk that the placebo and the medication pills may be mixed-up with each other by those conducting the test. To avoid this, a high-density, 2-dimensional micro bar code (such as PDF-417 from Symbol Technologies, Inc.) is either printed directly on the pill or on a label secured to the pill and read by a scanner just prior to distribution. The micro bar code can not be read with the unaided eye and is extremely difficult to discern any differences in the patterns of two codes, so the clinical trial participants (and their medical nurses, doctors and clinicians) do not know which is which.

For example, during a clinical trial, a company sends to a doctor at least two containers of pills, one container contains pills having active ingredients, the other, placebo pills. Ideally, the trial is run as a double blind trial wherein neither the doctor nor the patients know which container contains which pills. According to the invention, the doctor is also given a scanner gun connected to a computer having memory. The computer includes a monitor screen and a software program. The software program "asks" the doctor (or assistant) questions directed to the particulars of each patient within the study. At prescribed times, the computer will alert the doctor (or assistant) to give a particular pill to a particular patient from a particular container. The bar code located on each pill must be scanned by the scanning gun. The gun is directly connected to the computer and will read the bar code information off of each pill prior to the pill being administered to a particular patient. The bar code is preferably a 2-dimensional, high density-type micro bar code so that only the scanning gun may read the code and only the computer (following the particular software program) may interpret the code on each pill. As each pill is scanned, the computer will read and store the bar code information from the pill and store the information in its memory. It is preferred that the computer includes safeguards against tampering so that the information in the memory of the computer may be read only by authorized personal, similar to the function of a "black box" as a data collector in an aircraft.

As the gun scans each bar code form each pill, the information displayed on the monitor screen may be the actual code (shown in numeric form) or may be another code, as instructed by the software, which indicates to the doctor or assistant, neutral or misleading information regarding the scanned code of the particular pill.

According to another aspect of the invention, the pill may have a label with a bar code, that is removable so that the label may be directly adhered to a patient's chart, and later scanned into a central computer. Also, the container of pills may have multiple labels that can be selectively removed for placement onto pills within the container. These labels may include projecting tabs which facilitate their easy removal from the container. The label may be made of paper, plastic, such as MYLAR, or other biocompatible material. As discussed above, the label may or may not be digestible, depending on the application.

As discussed above, according to the invention, the code is preferably a mosaic code such as a 2 dimension, high density micro bar code, such as PDF-417 developed by Symbol Technologies, Inc. This type of code is essentially impossible to distinguish with the naked eye. Only an appropriate scanner (also available from Symbol Technologies, Inc.) is capable of deciphering the intricate patterns of each code.

The code may be read by a scanner for the purpose of identifying the source of the pill manufacture and the distributor responsible for its dissemination. Such information may be useful in an effort to prevent product tampering, unauthorized product repackaging and entry of gray goods.

The code may be read by a scanner for purposes of identifying the contents of the pill. This is useful for verifying information such as the medication contained within the pill and its potency or efficacy expiration date. This is done by correlating the code pattern read with information stored in a data base pertaining to the code pattern. Such a data base may be from a microprocessor-based personal computer system, a dedicated centralized computer system or from on-line services or even an INTRANET computer network service or an INTERNET computer network service or other microprocessor based systems.

According to the invention, emergency personnel at the scene of accident involving a person who overdosed or took any medication, for instance, may quickly use portable bar code scanners to read the code on unused pills to ascertain exactly what medication was taken in the overdose. This is desirable where the pill container holding the pills is unmarked or can not be found.

Different types of medication may be harmful if taken in combination together, although safe if taken separately, over a period of time. According to another aspect of the invention, prior to taking different medications, therefore, the code on each pill may be read and, by using appropriate software, the reading system may check for harmful combinations when pills are read in succession from the bar code scanner. The system may include the display of information regarding the ill effects that may occur if the combination of medication is taken. In this way, a warning is provided as a safeguard against taking the pills together in combination.

Alternatively, instead of checking pills in succession, a data base storing information on the medication that a particular patient/consumer is taking may be checked automatically to determine whether taking the new pill medication in combination with those identified from the data base poses any health risk. If so, a warning is issued of the potential health risks.

According to the invention, any machine readable code that is in a form other than human-readable alpha-numeric characters may be used. Such a code may be micro bar code, 2 dimensional codes, 3 dimensional codes, high or low density codes, as long as the particular code may fit onto a pill in a manner that allows the code to be read by a scanner. Other codes that may be used include UPC/EAN/JAN, Code 128, Code 39, Code Interleaved 2 of 5, EAN 128*, Codabar, PDF417, UPC-A, UPC-E, EAN 8, EAN 13, UPC/EAN 128. Each of these codes, if sized according to the particular pill size would be suitable for use on pills in accordance with the invention.

If PDF-417 micro bar code is used, according to the invention, a code with dimensions of about 8 mm long and about 4 mm wide may convey up to 10 digits of addressable information. This information may be actual data, such as an expiration date, National Drug Code, or lot number for the particular medication, or may simply be an address that directs a user to additional data located in a data base, including date of manufacture, the identity and location of the manufacturer, recommended dosage, dietary and related drug-usage information, contraindications, and the recommended price of the medication.

High density bar code is the preferred coding scheme, according to this invention, because it may be read quickly and accurately and may convey a great number of characters in very little space. The reason alpha-numeric characters are excluded for this invention is because they have been printed onto pills for many years and because they convey information in a spatially inefficient manner. A pill has a small surface area that does not lend itself to supporting many alpha-numeric characters. Also, pattern recognition software, while capable of recognizing alpha-numeric characters, deciphers the alpha-numeric character code slower and less reliably than would a bar code type scanner deciphering a bar code.

Even the alpha-numeric character readers require that the entire pattern be read (as opposed to a cross-section as would be the case when scanning vertical bar code lines) so that the pills must be oriented in a particular manner and held in that position while the scanner completes its scan. By using codes other than those containing alpha-numeric characters, therefore, both the reading time and deciphering time is faster and the orientation of the pill relative to the scanner is somewhat more flexible. For instance, reading an alpha-numeric character string upside down or sideways may cause some problems for pattern recognition software (e.g., M versus W and U versus C), but causes really no problem for bar code readers that can scan in many directions very rapidly to check for vertical bar code lines. By alpha-numeric, oriental characters and symbolic languages are also envisioned in addition to the alphabet and numbering system.

Up to now, there has been little incentive to develop scanners for reading at the micro bar code level. Since pills are three dimensional objects whose surfaces may or may not be flat and may or may not be oriented in a particular manner relative to a scanner, the preferred embodiment of a scanner is one that rotationally sweeps rapidly at least up to 180 degrees to ensure that the full code is read no matter the pill's orientation. It is assumed, of course, that the surface of the pill bearing the micro bar code faces the scanner and the scanning beam is aimed at the code. If this may not be the case, then multiple scanners (or one scanner and one or more mirrors) should be used, each positioned so that the full surface area of the pill will be scanned.

Another application of the invention includes a quick cross-check between the pills and their container. By comparing the code on each pill after scanning with an appropriate machine code reader for a matching pattern, a determination can be made readily as to whether the pills originally belonged in that container. Additional safeguards can be incorporated into the pill code, such as hidden code portions that are invisible to the naked eye or even if aided with a magnifier (e.g., only visible under infrared or ultraviolet light). The presence or absence of such hidden code portions within the code on the pill may help counter unauthorized or unintentional exchanges of pills in a container. A pill container, according to another embodiment of the invention, is made from (either entirely or in part, defining a scanning window) a material, such as plastic that permits at least one pill located therein to be scanned using a scanner located outside the container. In this manner, pill information may be decoded from the actual pill without opening a sealed container.

In another embodiment, the scanner has a built-in clock, or is connected to a clock (for example, through a computer), and the time the pill is scanned (and presumably the time the pill is taken) is recorded. This information helps assess the track record of the pill's efficacy and the conditions under which the pill was effective or ineffective. The scanning equipment may be connected via an electronic link-up to an on-line service or the INTERNET, and suitable software may automatically forward the statistical data gathered by the readers to a centralized compliance monitoring system or to a centralized evaluation center.

Often, nutrition plays a role in the efficacy of a medication. Recording a patient's diet before and after taking a medication (e.g., a pill) is a labor intensive task. Once obtained, it must be painstakingly converted as a data entry into a computer data base for storage purposes, but unless the record keeper is meticulous, the value of the data is subject to human error.

At present, catalogs are available that include a listing of products and, next to each picture (or listing) of the product, is a corresponding bar code. A consumer may scan the bar code to initiate an order for delivery of a selected product. In accordance with the invention, a similar concept may be applied to record dietary information of a patient before, during and after a pill is ingested.

According to the invention, a book is provided for the patient's use while following a medication schedule. The book contains pictures of different types of foods with an associated bar code next to each picture. The above-described micro bar code scanner/reader that reads the micro bar code on the pill is used to read the bar code in the catalog associated with a selected food item. If the reading is correlated with the time of day, such as with an electronic clock in electrical connection with the micro bar code scanner/reader, information may be recorded concerning the pill taken and the food item eaten and the time of day when both were taken. If the patient is instructed to take the medication as soon as the benefits wear off from the last medication taken, then the information would represent some measure of the efficacy of the pills. Since all the information is in digital form, no manual labor is necessary either to record the pill type, quantity, time of day or food items eaten. A statistical profile on efficacy is automatically generated and, when combined with profiles concerning the same medication but taken by other patients, a fairly reliable indicator of the duration of efficacy and the nutritional effects on efficacy is realized.

Alternatively, if a patient is instructed to take pills at set intervals throughout the day, provisions could be made for the patient to actuate a signal indicative of when the medication started to take effect and another signal indicative of when the medication efficacy ended. Such a signal could be generated by actuating a key on the scanner/reader. The actuation of the key would be tied into the electronic clock that runs to record the time of day when the code on the pill is read.

In addition, the scanner may read the bar code on the pill container, in the same manner as it is capable of reading micro bar code on a pill (as described above), and store the scanned information into a data base, yet avoid the need to manual record keeping on pill efficacy. Under such circumstances, the pills would not require micro bar coding because the record keeping could be done by reading the bar code on the container.

If the user of the scanner/reader makes a mistake, an error button could be actuated to retract entry of the last key actuation and substitute it by the next key actuation. The reader may have a speaker to enunciate confirmation of what was read.

The operation may be as follows:

(1) Patient or care provider scans code on pill with the reader. A beep sound is enunciated by the reader to confirm recognition of reading of the code.

(2) The patient scans code associated with the food/drink item consumed if any. The scanning may be of a food group containing the food/drink item or may also include scanning a quantity of the food/drink item consumed.

(3) An electronic clock is used to help record the time of day when the scanning of the codes took place. The scanner preferably contains this clock.

(4) The patient actuates a button when the pill works and actuates another button when the medication from the pill wears off. The time of day for both events is recorded based on the time of day being tracked by the clock.

(5) After an entry is made, confirmation is enunciated through speakers of the scanner.

(6) Immediately after making a mistake in actuating, the mistake may be removed entirely by actuating yet another button and then entering another entry as a substitute.

(7) All the scanned information may be used to establish a data base. Each scanner, therefore, may be given its own electronic identity code that is stored along with whatever other information is retrieved from memory of the scanner.

(8) The buttons of the scanner may have different colors, sizes and shapes to help distinguish between them. For instance, the button associated with signifying that the pill is taking effect could be green while that signifying that the pill no longer is taking effect could be red. The scanner could have a light that illuminates after one of the buttons is actuated and remains lit until the other button is actuated to serve as an indicator of the last button actuated. The reason for giving the buttons a different shape and size is to help visually impaired persons distinguish between the buttons. The error button could be a different size, shape and color from the other buttons.

By distributing such scanners to a large number of patients, there will be an ever increasing amount of information collected and stored in digital form. When combined together, statistical profiles could be generated to show how long different types of pills remain effective and under what circumstances they remain so, i.e., the relationship between pill effectiveness and nutrition could be depicted graphically. The concentration of medication in the pills could be varied and the effect of this variance on how quickly the pill takes effect and lasts could be analyzed from the data collected. Based on such analysis, the optimal conditions for taking medication could be determined. Other factors, such as the weight of the patient, that may affect how quickly the pill works and lasts could also be entered as data by being programmed into the scanner, preferably to read out automatically with the scanner identification number.

Since the scanner identification number is stored in association with information read from or entered into the scanner, any aberrations could be easily screened out from the statistical analysis to remove the effect of such information whose reliability is suspect. On the other hand, doctors or health care providers could retrieve information pertaining to a particular patient, analyze it, and change the medication accordingly as warranted by the analysis.

In addition, the scanner could be interactive in the sense of warning the patient that taking whatever was just scanned may not be recommended medically or may not be optimal. For instance, some studies suggest that taking grapefruit juice with pills helps to quicken the pill's absorption into the body because of its acidity while other drinks, such as apple juice, may have the reverse effect (because of its sugar content). Thus, if apple juice is scanned, a warning could be made by the scanner to recommend avoiding the selected type of juice and choose switch a different type of juice.

In view of the many different kinds of foods, it may be simpler for the patient to scan a bar code next to a picture of the particular type of food group instead of the actual food/drink item. On the other hand, if the patient regularly consumes the same food more often than not when taking the medication, this could be automatically programmed to speed up entry of information, e.g., unless the patient actuates a button, it will be assumed that the patient is taking the same type of juice with the pill.

Labeling the pill with micro bar code may be done in any conventional manner, such as is taught in marking a logo or code on a label and applying the label to the pill according to U.S. Pat. No. 4,478,658, whose subject matter is incorporated by reference. Of course, the adhesive, if any, and the ink, if any, should be non-toxic and otherwise biocompatible. Conventional water-based inks such as food coloring may be used.

It is preferred that the machine-readable bar code is printed onto a code-receiving layer made from a protein based film, such as keratin and gelatin, which is, in turn, adhered to the surface of the pill, preferably using water. Application of water, in a controlled manner, partially dissolves the water-soluble gelatin or keratin film and adheres the code-receiving layer to the surface of the pill. It is preferred that the code-receiving layer is "established" or formed on one surface of an appropriate release backing. The release backing is used to support the delicate protein-base code-receiving layer, as the code-receiving layer receives the bar code ink and is later applied to the surface of the pill. After a bar code is printing onto one exposed surface of the code-receiving layer, the release backing is pried away thereby leaving the code-receiving layer (with the code printed thereon) adhered to the surface of the pill. It is preferred that another layer (such as one made from gelatin) be located outside (on top of) the code-receiving layer to protect the printed code from the environment, in particular, moisture and abrasion.

Uncoated tablets differ from capsules, caplets, gelcaps and coated tablets in that their outer surface is porous and is not sealed or hardened as is the case for these other types. When the outer surface is sealed or hardened, it is easier to print with wet ink onto the surface directly or adhere a label to its surface than for a porous outer surface of an uncoated surface. It such instance, a portion of the outer surface of the uncoated tablet is sprayed (or otherwise coated) with a substance to aid in the printing onto the tablet or adhering to the tablet. The substance may be made from a material based on sugar, wax, gelatin, keretin, collagen, polymers or protein.

Some conventional techniques of suitable printing on uncoated tablets or uncoated tablet cores include U.S. Pat. No. 4,548,825, issued Oct. 22, 1985 to Voss et al. and entitled METHOD FOR INK-JET PRINTING ON UNCOATED TABLET CORES, and U.S. Pat. No. 5,006,362, issued Apr. 9, 1991 to Hilborn and entitled BRANDING PHARMACEUTICAL DOSAGE FORMS, FOOD AND CONFECTIONERY PRODUCTS WITH AQUEOUS INGESTIBLE INKS. Printing a human-readable symbology onto machine-readable symbology is known from U.S. Pat. No. 4,889,367, issued Dec. 26, 1989 to Miller and entitled MULTI-READABLE INFORMATION SYSTEM and may be applied as well. Further, a suitable code reading system for reading invisible bar codes is disclosed in U.S. Pat. No. 5,331,140, issued Jul. 19, 1994 to Stephany and entitled CODE READING SYSTEMS. The contents of each of these patents is incorporated herein by reference.

In accordance with the present invention, any type of machine-readable code including micro bar code, holograms, two or three dimensional machine-readable codes, and other high-density codes, is imprinted either directly or indirectly onto the surface of a medication tablet or capsule (i.e., pill). The type of ink or coating material used to imprint the machine-readable code on the pill is non-harmful (i.e., biocompatible) to humans (and/or animals) when digested and furthermore is machine readable by scanning equipment, i.e., meets the minimum absorption requirements of bar code reading. The code pattern is either printed directly on the pill, or is first printed on a carrier or code-receiving layer, as described above, such as paper, thin plastic film (e.g., PVOH or EVOH), a protein-based material, such as gelatin and keratin film or related collagen-based films, or a biocompatible polymeric sheet or film. The carrier is then preferably applied to the pill during the manufacturing process, as described above, or at a later time, perhaps by a doctor, nurse, or pharmacist, depending on the specific application of the invention.

According to another embodiment, the ink or coating used in making the entire code, or a predetermined portion of the code, is machine readable in non-visible wavelengths and is otherwise invisible to the human eye. Invisible codes on medication tablets (or capsules) provides a high level of tamper-proof security and control of the medications.

The specific location of the code on the pill will vary depending on the type of code used, the type of scanner used to read the code, and the size, shape and type of the pill being coded. For capsules wherein two interfitting hollow shells made from a bio-compatible material (such as gelatin) are used to contain a prescribed dosage of a drug, the code is either printed on the exterior surface of either capsule or on the interior surface of either capsule (assuming that the code may be scanned through the capsule material) or on both the exterior and interior surfaces wherein a preferably simple, special tamper-proof code (invisible or visible) is located along the interior surface. Coding the interior capsule shell wall prevents accidental or deliberate damage or tampering of the code. Codes located on the exterior surface of the pill (regardless of the type) are preferably protected against abrasion or tampering by a clear coating or layer. This layer may function as the carrier substrate material wherein the code is located on a rear surface of the carrier substrate material.

In accordance with the invention, pills are of the type that are coated tablets (such as an Advil brand tablet); again the code may be either directly imprinted on the hard exterior shell using the same technology used to print the logo of the manufacturer or name of the medication (such as "Advil"), or a carrier material, as described above, may be used. In either case, either the carrier material or the exterior shell of the tablet (or capsule) must meet the requirements for the scanner to effectively and accurately read the code (i.e., the difference in reflectivity between the ink (the bars in a bar code, for example) and the carrier surface (the spaces in a bar code, for example) is at least a minimum percentage. These minimum scanning requirements are known by those skilled in the art.

In accordance with the invention, pills of the type that are non-coated tablets, such as aspirin or Rolaids brand antiacid medications or are otherwise porous and/or have a chalk-like exterior surface, a "patch" of a non-absorbent bio-compatible material in the form of a coating or applied film, such as a wax, gelatin, keratin, collagen, other protein based materials, polymeric films, EVOH or PVOH is first (or simultaneously) applied to a predetermined location on the exterior surface of the pill. The code may then be directly applied to the non-absorbent patch. The purpose of the patch is to provide a surface for carrying the ink used to make the machine-readable code meeting the above-described reflectance requirements. The above-described carrier material supporting a pre-printed code may also be used with such non-coated pills in place of, or in addition to the above-described applied patch. Furthermore, the ink or coating material used to convey or imprint the code on non-coated type pills may be a non-spreading type ink adapted to be directly applied to chalky surfaces without losing resolution of the code.

In accordance with the invention, the code is preferably imprinted in such a manner to be easily machine readable by an appropriate laser scanner. The orientation of the code will depend on the type and shape of the pill. For example, elongated, cylindrical capsule-type pills may include a code that is made up of bars which completely surround the exterior of the pill following the longitudinal axis. In this arrangement, the capsule-type pill may be easily directed down a transparent chute or pipe and be simultaneously read by a single scanner located adjacent to the chute or pipe.

For ovaloid-shape pills (i.e., pills shaped like an M&M candy), the code may be imprinted on either or both sides, and include concentric rings of varying thickness bars and spaces, depending on the type of code. In this case, the chute may be elliptical in cross-section to receive and guide this type of pill. Again, one or more adjacent scanners. may be used to read the code as the pills pass through the chute. The most efficient location of the bar code on the surface of a pill may be determined by one skilled in the art of bar code scanning.

In accordance with another embodiment of the invention, the ink used to make the code and the carrier material used to carry the code may be intentionally made of a non-digestible material so that after consumption of a particular coded medication, the information conveyed by the code will be passed by the patient. The code may then be recovered from the patients excrement, treated as necessary (i.e., washed), and scanned. This particular embodiment of the invention is useful in clinical studies where patients either consume several different types of medications during a trial period and/or consume one of either a placebo or active pill. Since the codes of this embodiment are not destroyed after the pill is consumed, the information encoded on the pill prior to consumption may be later extracted to investigate symptoms or fatalities of the patient or to check the integrity of the study (i.e., to ensure that the patient did take the prescribed medication). The above-described embodiment could also be applied to all types of over-the-counter and prescription pills. In this manner, any death or unexplained illness to any human or animal due to a consumed medication or drug could be easily and quickly investigated or accurately treated. Furthermore, should the quality of a particular medication be at fault, the entire lot or related batch of the medication could be isolated and further illness prevented.

According to another embodiment of the invention, a container is provided to transport and dispense a plurality of pills in bulk. Manufacturers use the containers to supply pills to hospitals, for example. The containers are sealed and are tamper-proof prior to and upon arrival at the hospital. Each container is adapted to be received into a dispensing machine. These dispensing machines are located throughout the hospital (e.g., emergency room, supply room, etc.) and are lockable. Once locked, the containers located within open to allow their contained pills to be dispensed in a controlled manner from the machine. In operation, the dispensing machine first receives an authorization code from a keypad (as typed in by a nurse, for example) or scanned in information from a bar code located on a nurse's ID badge. The user then inputs a patient or medication request code and thereafter either selects and/or receives the proper pill combination from the various containers located within the machine in an appropriate transportable, preferably sealed, and perhaps tamper-proof container. Just prior to being dispensed, each selected pill traverses an internal chute wherein an information code located on the pill is machine read. The information of the code of each selected pill is sent to a local computer or local area network to verify the request, update billing, and verify and update scheduling for the particular patient. If the request is verified and approved, the pill (or pill combination) is released from the chute. Otherwise, the pill is diverted to an internal holding bin which is not-accessible to the user of the machine.

The purpose of the above-described dispensing machine and sealable container is to keep track of each pill within the hospital and to save the expense of individual packing. Furthermore, since the exact number of pills sent to the hospital is known, the number of pills remaining is also known. Such information may be transmitted to the hospitals inventory computer to automatically signal appropriate personnel to reload a particular container prior to it becoming completely empty, and/or signal the pill supplier to send another bulk loaded container. In either case, no one has direct unaccounted access to the medication. Tampering and pilfering of medication is either prevented or evident once it occurs.

Once dispensed, the nurse may enter a patient's room and administer the medication. According to the invention, the protocol followed by the nurse may include scanning his or her ID badge, room code, and patient ID bracelet upon entering a room using a hand-held scanning wand plugged into a wall connector which links the scanner to the hospital computer network. The nurse then scans the medication from pre-printed coded labels in the case of a liquid medicant, or scans a suspended bar code element located in the liquid, as described below, and/or scans the code located on the pill surface, as described above. The network then verifies that the patient information, the nurse information, the room information and the medication information is correct and authorized and records all of this information in a secured memory storage. The billing computer is updated to account for the cost of the exact medication scanned and the scheduling computer is interrogated to ensure that the medication is proper and timely (not too early or late) administered. If all is correct, a green light or appropriate sound or signal is activated in the patient's room, signaling the nurse to give the medication. Once given, the nurse transmits a verification signal back to the computer to be recorded and later used as proof of the nurse witnessing the patient taking the medication. If the medication is improper, or the nurse is not on a predetermined list, to or the medication is too early or late, as prescribed by the attending doctor or any other conflict is detected), an alarm (or other signal) is activated to appropriate security and/or a red stop signal is provided to the nurse.

U.S. Pat. No. 5,502,944, issued Apr. 2, 1996 to Kraft et al., entitled MEDICATION DISPENSER SYSTEM is incorporated by reference. It teaches automating the dispensement process with robotics manipulating a selected container to transfer medication units from the container directly to the package. Medication is directly transferred from the container to the package so that no cross-contamination occurs. The present invention may be incorporated into this teaching by use a scanner that reads the machine readable code on pills to make the appropriate identification for the robotics manipulation.

Another embodiment of the invention incorporates a bar code onto an element that is suspended into a liquid. The element may be a small strip of clear or white MYLAR (or other suitable) plastic. A plurality of these elements are placed into a container of liquid. As the liquid is poured into a dispensing cup, at least a portion of the suspended elements, each bearing identical bar code information also enters the dispensing cup. Preferably, the elements are invisible or at least barely noticeable to the naked eye so that the patient drinking the liquid will not see, taste, or feel the elements in the liquid as the liquid is swallowed. As any given moment, the liquid in the dispensing cup may be scanned by a bar code laser-type scanner. The laser beam will eventually read one of the many elements in suspension in the liquid and the information conveyed in the form of the bar code will be read and understood.

According to an embodiment of the invention, a pill has an outer surface that includes a machine readable bar code According to another embodiment of the invention, a pill has a transparent layer defining an outer surface and an inner surface. The pill includes a machine readable bar code on the inner surface under the transparent layer.

According to another embodiment of the invention, a pill includes a label having an outer surface and an adhering surface. A machine readable bar code is located on the outer surface of the label. The adhering surface of the label is adhered to an outer surface of the pill.

According to another embodiment of the invention, a pill includes a label having an outer surface and an adhering surface. A machine readable bar code is located on the outer surface of the label. The adhering surface is adhered to an outer surface of the pill. At least a portion of the bar code is only readable using a wavelength that is located outside the visible spectrum (i.e., not visible by a human eye).

According to another embodiment of the invention, an element made from a biocompatible material has a printable surface onto which a micro bar code is printed. At least one, preferably many elements are suspendible in a liquid. The bar code information located on each element may be read through the liquid.

According to another embodiment of the invention, a medication dispenser includes at least one supply chamber for receiving a bulk-container of pills, a chute through which selected pills may be dispensed, a control gate located adjacent to the chute for controlling the transport of a pill into the chute, and a scanner adapted to read bar code. The control gate is connected to and controlled by a computer. Each pill has a machine readable bar code. Prior to being dispensed, a pill is guided through the chute past the scanners so that the bar code information located on the pill may be read and the information sent to the computer.

According to another embodiment of the invention, a pill includes a machine readable bar code. The bar code includes a pattern that has a dimension and complexity that prevents (or otherwise discourages) a human to distinguish, at a glance, any difference within the patterns of two or more pills.

What is claimed is:

1. A method of verifying that medication to be administered is correct, comprising:
   scanning a bar code on an identification bracelet worn by a patient to ascertain patient information;
   scanning a bar code pertaining to medication to be administered to the patient to ascertain medication information;
   verifying whether the patient information and the medication information is correct and authorized based on both of the scannings by accessing a network; and
   activating an alarm if the verifying indicates that the medication is improper for administration to the patient.

2. A method of claim 1, further comprising notifying that the medication may be given to the patient provided the verifying finds that the patient information and the medication information is correct; and transmitting a verification signal upon witnessing that the patient was administered the medication subsequent to the notifying.

3. A method of claim 1, further comprising scanning a nurse's badge, and using the network to verify that nurse's information scanned from the nurse's badge is correct and authorized.

4. A method of claim 1, further comprising updating billing to account for a cost of the scanned medication.

5. A method of claim 1, wherein the verifying includes interrogating a computer with scheduling to determine whether the medication is being administered too early or too late.

6. A method of claim 1, wherein the medication is contained in pills that are sealed individually within single-pill containers.

7. A method of administering medication, comprising:
   keeping track of each individual one of a plurality of pills by machine reading a machine readable code assigned to each of the individual pills;
   dispensing an individual one of the pills based on the machine reading; and
   adjusting inventory requirements for stocking of the individual pills based on the machine reading and the dispensing.

8. A method of claim 7, further comprising verifying prior to dispensing that the individual pill is scheduled to be taken by the particular patient by checking with scheduling information stored in a computer.

9. A method of claim 8, further comprising billing a cost for the individual pill based on the machine reading and the verifying.

10. A method of claim 7, wherein the pills are individually within single-pill containers prior to the dispensing.

11. A drug identification system for marking solid form drugs comprising a pill imprint having a first marking in the form of a human recognizable symbol and a second marking in the form of a machine readable bar code, wherein the human recognizable symbol provides a general identification suitable for categorical identification and communication, and the machine readable bar code provides an item identification.

12. The drug identification system of claim 11 wherein the bar code is a 2D bar code.

13. A method of determining information concerning a pill, comprising dispensing pills from inventory individually, identifying a source and a distributor of each of the dispensed pills by accessing a database and scanning a machine readable code assigned to each of the pills individually.

14. A method of claim 13, wherein the pills are individually within single-pill containers.

15. A method of scanning, comprising scanning a machine readable code while a pill is within a container, decoding information pertaining to the pill from the scanned machine readable code, and evaluating the decoded information and accessing a database to determine whether taking the pill poses any potential health risk and, if so, providing a warning.

16. A method of claim 15, wherein the scanning is through a transparent material through which the machine readable code is readable.

17. A method of claim 15, further comprising recording a time of day in response to the scanning.

18. A method of claim 17, further comprising determining efficacy of the pill based in part on the recorded time of day.

19. A method of claim 15, wherein the machine readable code is on the sealed container.

20. A method of claim 16, further comprising effecting record keeping by reading the machine readable code on the sealed container.

21. A method of record keeping, comprising scanning a machine readable code on a container of at least one pill and storing information pertaining to what was scanned and a time of day of the scanning, and recording dietary information at times before, during and after the scanning and correlating same with the stored information.

22. A method in of claim 18, further comprising storing information pertaining to food and a time a day when the food is eaten as the dietary information and correlating with the stored information.

23. A method of claim 13, wherein the machine readable code is in a form other than human-readable alpha-numerical characters.

24. A method of claim 23, wherein the identifying arises from the scanning upon correlating with information stored in a data base.

25. A method of claim 15, wherein the machine readable code is in a form other than human-readable alpha-numeric characters.

26. A method of claim 25, wherein the evaluating is based on correlating the machine readable code with information stored in a data base.

27. A method of claim 7, wherein the pills are selected from a group consisting of tablets, caplets, gel-caps, pellets, gum-pieces, capsules, edible items that are biocompatible that contain any consumable herb, chemical, mineral, vitamin, plant or animal product, drug or placebo.

28. A method of claim 13, wherein the pills are selected from a group consisting of tablets, caplets, gel-caps, pellets, gum-pieces, capsules, edible items that are biocompatible that contain any consumable herb, chemical, mineral, vitamin, plant or animal product, drug or placebo.

29. A method of claim 15, wherein the pill is selected from a group consisting of a tablet, a caplet, a gel-cap, a pellet, a gum-piece, a capsule, an edible item that is biocompatible that contains any consumable herb, chemical, mineral, vitamin, plant or animal product, drug or placebo.

30. A method of claim 21, wherein the pill is selected from a group consisting of a tablet, a caplet, a gel-cap, a pellet, a gum-piece, a capsule, an edible item that is biocompatible that contains any consumable herb, chemical, mineral, vitamin, plant or animal product, drug or placebo.

31. An apparatus to verify that medication to be administered is correct, comprising:
  scanning equipment suited to effect a scanning a bar code on an identification bracelet worn by a patient to ascertain patient information and to effect a scanning a bar code pertaining to medication to be administered to the patient to ascertain medication information;
  verification equipment suited to effect verifying as to whether the patient information and the medication information is correct and authorized based on both of the scannings by accessing a network; and
  an alarm arranged to be activated as a consequence of the verifying indicating that the medication is improper for administration to the patient.

32. A system of determining information concerning a pill, comprising dispensing equipment configured to dispense pills from inventory individually, and identification equipment configured and arranged to identify a source and a distributor of each of the pills dispensed by the dispensing equipment by accessing a database and scanning a machine readable code assigned to each of the pills individually.

33. A system of claim 32, wherein the pills are individually within single-pill containers.

34. A system of administering medication, comprising:
  equipment configured to keep track of each individual one of a plurality of pills by machine reading a machine readable code assigned to each of the individual pills;
  dispensing equipment configured to effect dispensing of an individual one of the pills based on the machine reading; and
  equipment configured to adjust inventory requirements for stocking of the individual pills based on the machine reading and the dispensing.

35. A system suited to scan, comprising scanning equipment suited to scan a machine readable code while a pill is within a container, decoding equipment configured and arranged to decode information pertaining to the pill from the scanned machine readable code, and equipment configured and arranged to evaluate the decoded information and to access a database to determine whether taking the pill poses any potential health risk and, if so, provide a warning.

* * * * *